United States Patent
Kariyanahalli

(10) Patent No.: US 9,641,551 B1
(45) Date of Patent: May 2, 2017

(54) SYSTEM AND METHOD FOR TRAVERSING A NAT DEVICE WITH IPSEC AH AUTHENTICATION

(71) Applicant: vIPtela Inc., San Jose, CA (US)

(72) Inventor: Praveen Raju Kariyanahalli, San Ramon, CA (US)

(73) Assignee: vIPtela Inc., San Jose, CA (US)

( * ) Notice: Subject to any disclaimer, the term of this patent is extended or adjusted under 35 U.S.C. 154(b) by 368 days.

(21) Appl. No.: 13/966,281

(22) Filed: Aug. 13, 2013

(51) Int. Cl.
*H04L 29/06* (2006.01)

(52) U.S. Cl.
CPC ...... *H04L 63/164* (2013.01); *H04L 29/06959* (2013.01); *H04L 63/0272* (2013.01); *H04L 63/123* (2013.01)

(58) Field of Classification Search
CPC . H04L 63/164; H04L 63/123; H04L 63/0485; H04L 63/0272; H04L 29/06959
See application file for complete search history.

(56) References Cited

U.S. PATENT DOCUMENTS

| | | | | |
|---|---|---|---|---|
| 6,963,982 B1* | 11/2005 | Brustoloni | ........ | H04L 29/12009 713/160 |
| 7,120,930 B2* | 10/2006 | Maufer | ............. | H04L 29/12018 726/11 |
| 7,143,137 B2* | 11/2006 | Maufer | ............. | H04L 29/12018 709/205 |
| 7,360,083 B1* | 4/2008 | Ragireddy | .......... | H04L 63/0428 713/160 |
| 7,366,894 B1* | 4/2008 | Kalimuthu | .......... | H04L 63/0272 713/153 |
| 7,519,834 B1* | 4/2009 | Dondeti | ................ | H04L 63/065 713/190 |
| 7,606,191 B1* | 10/2009 | Breau | ................. | H04L 12/4641 370/328 |
| 7,620,070 B1* | 11/2009 | Maufer | ................... | H04L 49/90 370/473 |
| 7,716,369 B2* | 5/2010 | Le Pennec | ........ | H04L 29/12509 709/245 |
| 7,848,335 B1* | 12/2010 | Kang | .................. | H04L 12/4633 370/401 |
| 7,860,098 B1* | 12/2010 | Biswas | ............. | H04L 29/12556 370/352 |

(Continued)

OTHER PUBLICATIONS

McGrew et al., Cryptographic Algorithm Implementation Requirements and Usage Guidance for Encapsulating Security Payload (ESP) and Authentication Header (AH), Aug. 2014, Internet Engineering Task Force (IETF), RFC 7321, pp. 1-11.*

(Continued)

*Primary Examiner* — Eleni Shiferaw
*Assistant Examiner* — Nelson Giddins
(74) *Attorney, Agent, or Firm* — Maschoff Brennan

(57) ABSTRACT

A method for routing IP packets with IPSec AH authentication is disclosed. The method includes locating overlay edge routers between private domains and their associated NAT routers. Outbound packets from a source private domain are modified by its overlay edge router to include IPSec AH authorization data computed using IP source and destination addresses that match a packet's final source and destination IP address upon final NAT translation immediately prior to delivery to a host of a destination private domain.

7 Claims, 12 Drawing Sheets

(56) References Cited

U.S. PATENT DOCUMENTS

| | | | | |
|---|---|---|---|---|
| 7,949,785 B2* | 5/2011 | Alkhatib | ............... | G06Q 10/109 709/245 |
| 8,041,824 B1* | 10/2011 | Maeng | .................... | H04L 63/10 709/229 |
| 8,776,209 B1* | 7/2014 | Kumar | ................ | H04L 63/0272 380/270 |
| 2002/0133534 A1* | 9/2002 | Forslow | ............... | H04L 12/4641 709/200 |
| 2003/0005103 A1* | 1/2003 | Narad | ..................... | H04L 45/16 709/223 |
| 2003/0076830 A1* | 4/2003 | Asano | ............... | H04L 29/12009 370/392 |
| 2003/0108041 A1* | 6/2003 | Aysan | ................. | H04L 12/4633 370/389 |
| 2003/0233452 A1* | 12/2003 | Maufer | ............. | H04L 29/12018 709/225 |
| 2003/0233568 A1* | 12/2003 | Maufer | ............. | H04L 29/12018 726/12 |
| 2004/0037260 A1* | 2/2004 | Kakemizu | ........... | H04L 12/4641 370/338 |
| 2004/0136356 A1* | 7/2004 | Kuo | .................. | H04L 29/12386 370/351 |
| 2004/0205245 A1* | 10/2004 | Le Pennec | ........ | H04L 29/12509 709/245 |
| 2004/0249911 A1* | 12/2004 | Alkhatib | ............... | G06Q 10/109 709/223 |
| 2005/0022017 A1* | 1/2005 | Maufer | ............... | H04L 63/0236 726/4 |
| 2005/0135359 A1* | 6/2005 | Chang | ............... | H04L 29/12009 370/389 |
| 2006/0253701 A1* | 11/2006 | Kim | .................. | H04L 29/12358 713/153 |
| 2006/0259583 A1* | 11/2006 | Matsuura | .......... | H04L 29/12009 709/218 |
| 2007/0002857 A1* | 1/2007 | Maher | ................. | H04L 12/4633 370/389 |
| 2007/0058644 A1* | 3/2007 | Brahmbhatt | ............ | H04L 29/12 370/401 |
| 2008/0317011 A1* | 12/2008 | Datta | .................. | H04L 12/4633 370/356 |
| 2009/0022152 A1* | 1/2009 | Henry | ................. | H04L 29/1233 370/389 |
| 2009/0040942 A1* | 2/2009 | Yang | .................... | H04L 12/2602 370/253 |
| 2009/0113203 A1* | 4/2009 | Tsuge | ................ | H04L 29/12377 713/151 |
| 2010/0205313 A1* | 8/2010 | Boire-Lavigne | ...... | H04L 29/125 709/228 |
| 2010/0232503 A1* | 9/2010 | Morimoto | ........... | H04W 76/022 375/240.13 |
| 2011/0013637 A1* | 1/2011 | Xue | .................... | H04L 12/4679 370/395.5 |
| 2011/0016309 A1* | 1/2011 | Motoyama | .......... | H04L 12/4633 713/153 |
| 2012/0011589 A1* | 1/2012 | Chen | ................ | H04L 29/12367 726/24 |
| 2012/0106559 A1* | 5/2012 | Kim | ...................... | H04L 63/029 370/401 |
| 2013/0133057 A1* | 5/2013 | Yoon | ....................... | G06F 21/00 726/12 |
| 2013/0294461 A1* | 11/2013 | Zhou | ................... | H04L 61/2532 370/475 |
| 2014/0075189 A1* | 3/2014 | Abraham | .............. | H04W 76/04 713/168 |
| 2014/0280839 A1* | 9/2014 | Agrawal | ............ | H04L 61/2514 709/223 |
| 2015/0359033 A1* | 12/2015 | Stojanovski | .......... | H04W 74/02 370/328 |

OTHER PUBLICATIONS

Manral, Cryptographic Algorithm Implementation Requirements for Encapsulating Security Payload (ESP) and Authentication Header (AH), Apr. 2007, Network Working Group, Request for Comments: 4835. pp. 1-11.*

Kent, IP Authentication Header, Dec. 2005, Network Working Group, Request for Comments:4302, pp. 1-34.*

Kent et al., IP Authentication Header, Nov. 1998, Network Working Group, Request for Comments: 2402, pp. 1-22.*

B. Aboba, et al., "IPsec-Network Address Translation (NAT) Compatibility Requirements", Mar. 2004, Network Working Group RFC: 3715, p. 1-18.*

Steve Friedl, "An Illustrated Guide to IPsec", Jun. 2008, Steve Friedl's Unixwiz.net Tech Tips, http://unixwiz.net/techtips/iguide-ipsec.html, p. 1-19.*

* cited by examiner

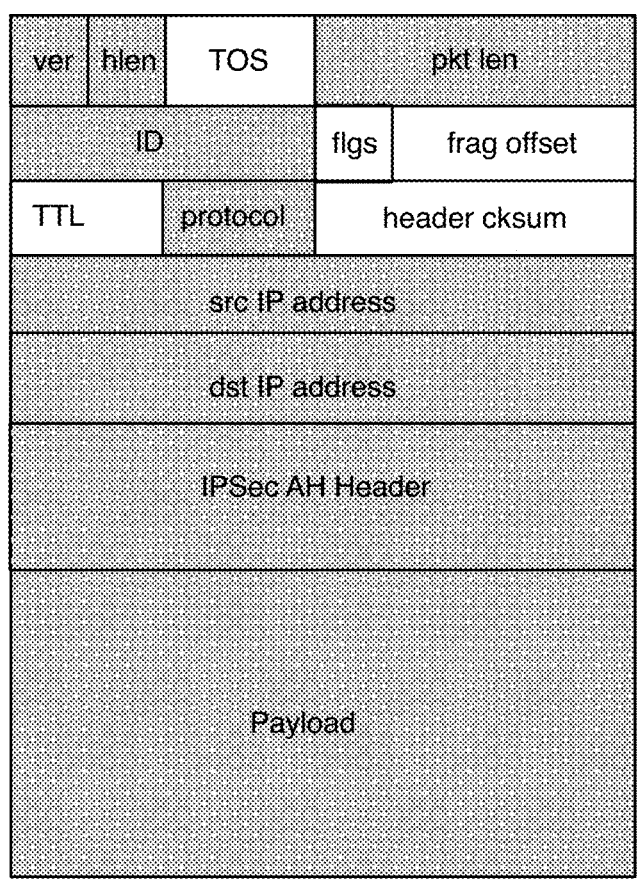
Prior Art  FIG. 1C

(12)  US 9,641,551 B1

SYSTEM AND METHOD FOR TRAVERSING A NAT DEVICE WITH IPSEC AH AUTHENTICATION

FIELD

Embodiments of the present invention relate to network security.

BACKGROUND

Internet Protocol security (IPSec) is a protocol suite that provides mechanisms for authenticating and encrypting data flowing within a network such as a Virtual Private Network (VPN).

Authentication Header (AH) and Encapsulating Security Payload (ESP) are wire-level protocols provided by IPSec to authenticate (AH) and encrypt (ESP) data. AH may be used in tunnel mode or transport mode.

Transport mode provides a secure connection between two endpoints as it encapsulates the payload portion of Internet Protocol (IP) packets sent over the secure connection. With tunnel mode, the entire IP packet is encapsulated thereby to provide a virtual secure hop between the two endpoints.

FIG. 1A shows the contents of an IP datagram 100 that has undergone IPSec AH authentication to include an AH header. FIG. 1B shows the components of the AH header 102 in greater detail. It will be seen that the AH Header 102 includes authentication data 104. The data 104 is usually a cryptographic hash-based message authentication code computed over nearly all fields of the original IP packet save for those that are modified in transit. The fields modified in transit include TTL and header checksum. FIG. 1 C shows the IP datagram 100 with the fields that are protected by AH Authentication shaded. The data 104 carries an integrity check value (ICV) which may be a MD5 or SHA-1 hash.

Network Address Translation (NAT) is a technology that is used to map a range of private addresses to and from a (usually) smaller set of public addresses. This reduces the demand for routable public IP space. NAT devices work by modifying IP headers associated with an IP datagram on the fly. In particular the source and/or destination IP addresses are changed. When a source or header IP address is changed, it forces a recalculation of the header checksum. This has to be done anyway, because the NAT device typically serves as one "hop" in the path from source to destination, and this requires the decrement of the TTL (Time To Live) field. However, as noted above since the TTL and header checksum fields are always modified in flight, AH knows to excludes them from coverage, but this does not apply to the IP addresses. These are included in the integrity check value, and any modification will cause the check to fail when verified by the recipient. FIG. 1D shows the IP datagram 100 with the fields that are modified by NAT shaded and FIG. 1E shows the IP datagram 100 with the fields that are broken by NAT shaded.

Because the ICV incorporates a secret key which is unknown by intermediate parties, the NAT router is not able to recalculate the ICV, making NAT incompatible with IPSec AH authentication.

SUMMARY

According to a first aspect of the invention, a method for routing IP packets with IPSec AH authentication is disclosed. The method includes locating overlay edge routers between private domains and their associated NAT routers. Outbound packets from a source private domain are modified by its overlay edge router to include IPSec AH authorization data computed using IP source and destination addresses that match a packet's final source and destination IP address upon final NAT translation immediately prior to delivery to a host of a destination private domain.

Other aspects of the invention will be apparent from the detailed description below.

BRIEF DESCRIPTION OF THE FIGURES

FIG. 1C shows the fields of the IP packet that are protected by IPSec AH authentications.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention teach extending IPSec AH Authentication to NAT device so that IPSec AH authentication may be used to protect IP packets that traverse a NAT device.

Figure 1A:
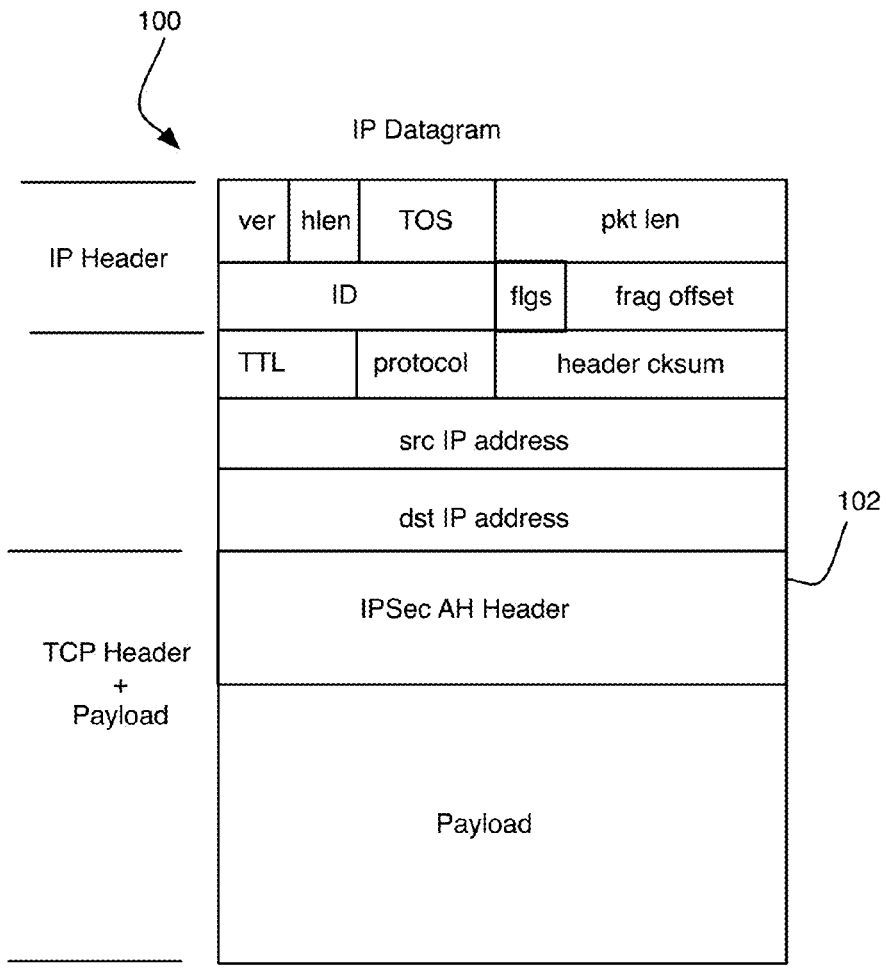
FIG. 1A shows the contents of a IP packet.
Figure 1B:
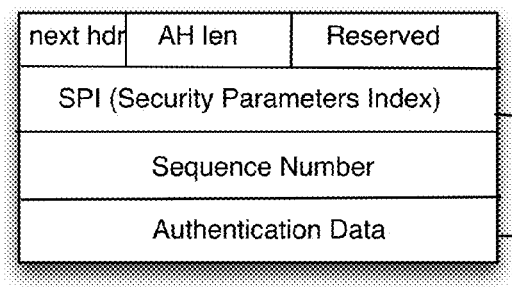
FIG. 1B shows the IPSec AH Header in greater detail.
Figure 1D:
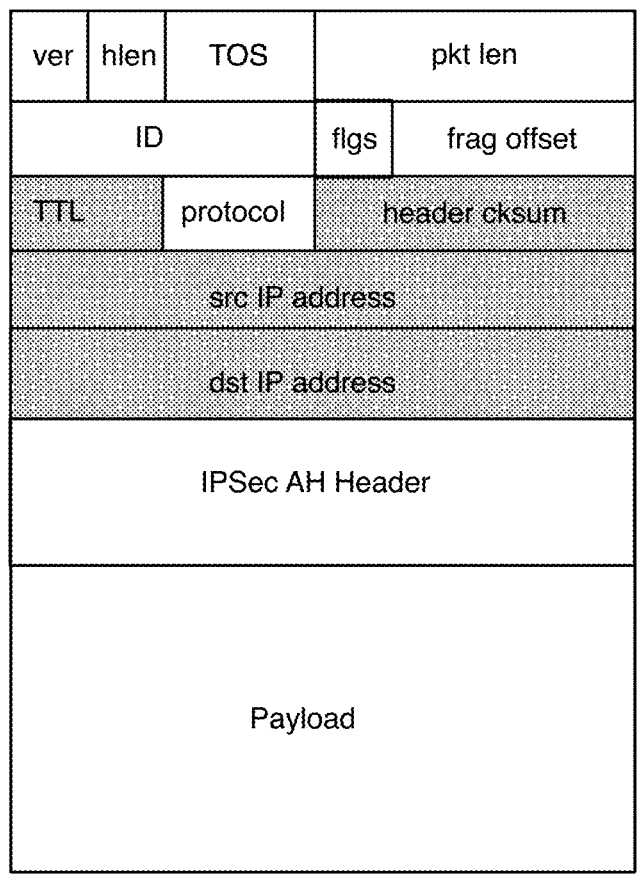
FIG. 1D shows the fields of the IP packet that are modified by a Network Address Translation (NAT) device.
Figure 1E:
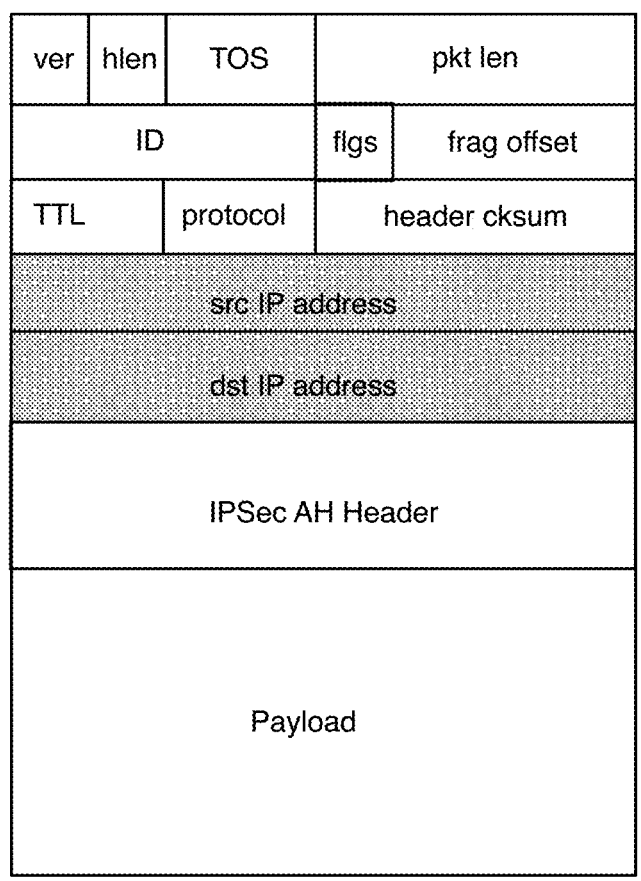
FIG. 1E shows the fields of the IP packet that are broken by NAT.
Figure 2A:
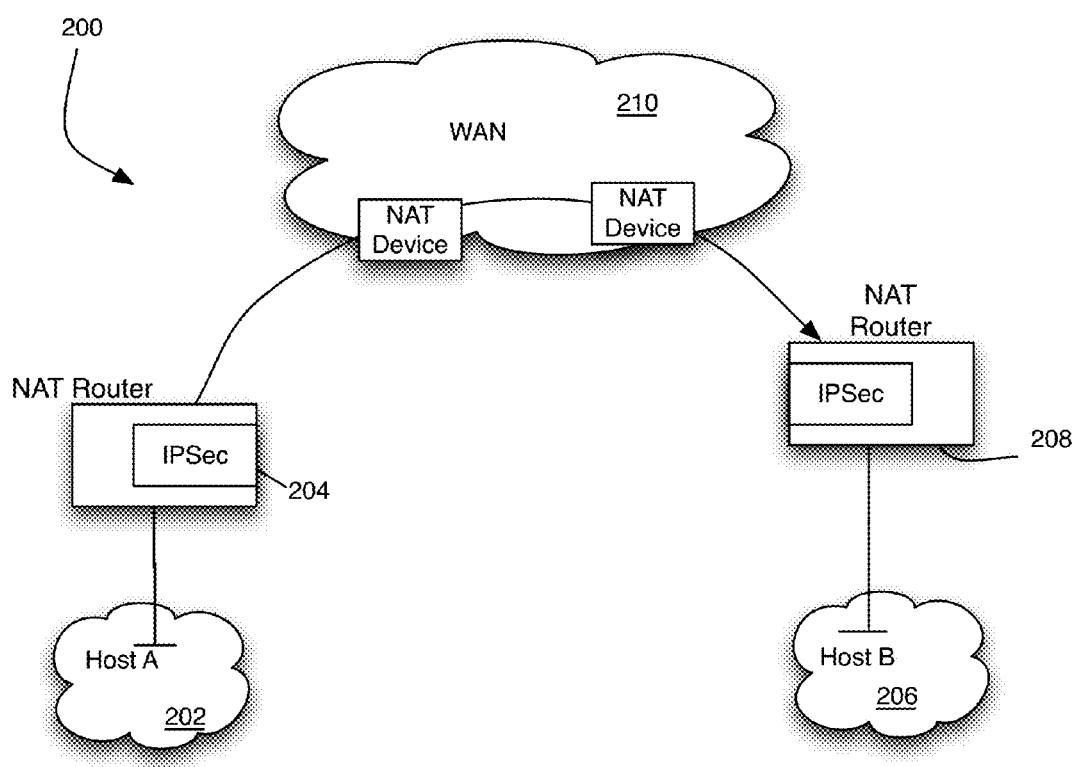
FIG. 2A shows a network setup for transmitted packets from a Host A to a Host B across NAT devices.
Figure 2B:
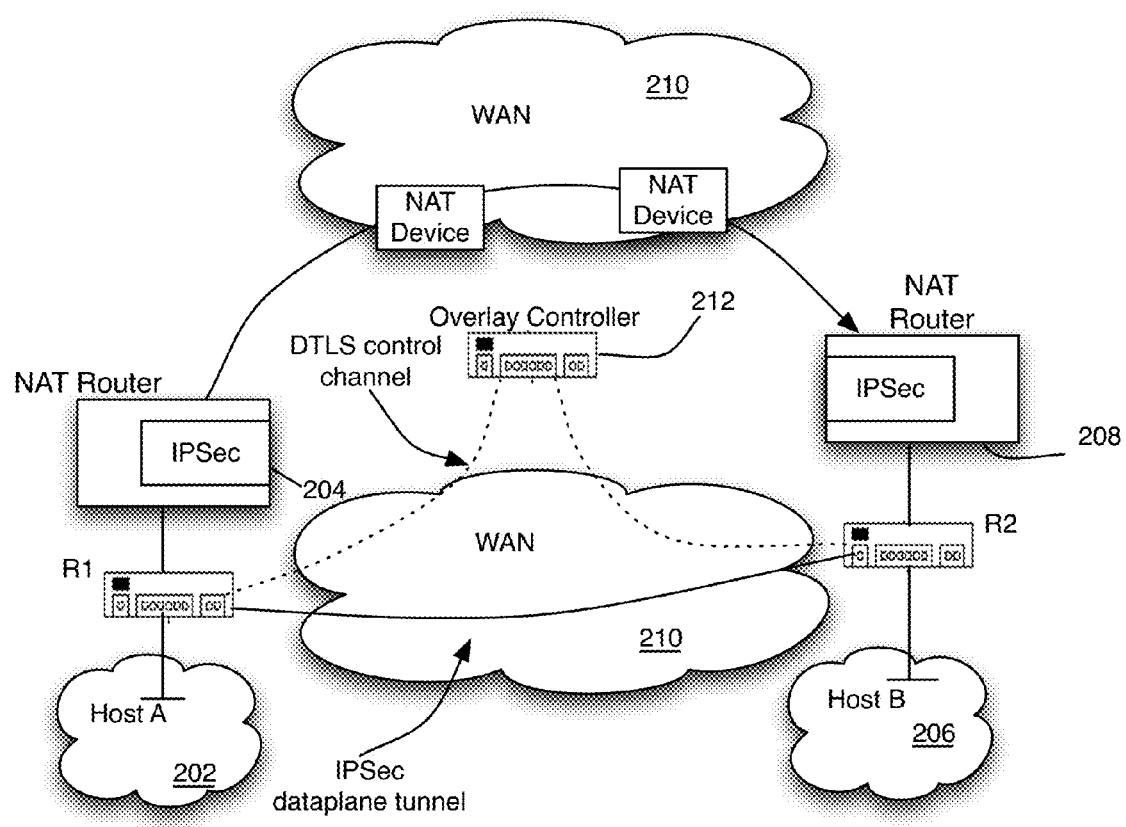
FIG. 2B shows the network setup of FIG. 2A modified by the creation of an overlay domain (OD) to facilitate packet transmission from the Host A to the Host B with IPsec AH authentication across the NAT devices, in accordance with one embodiment of the invention.

To understand embodiments of the invention, consider the network setup 200 shown in FIG. 2 which will be used to illustrate how IP packets from a Host A within a private network 202 located behind a NAT router 204 can be encrypted with IPSec AH authentication and delivered to Host B within a private domain 206 located behind a NAT router 208 via an intermediate transport network 210 such as the Internet.

In one embodiment, an overlay domain such as is described in co-pending U.S. patent application Ser. No. 13/789,618, which is incorporated herein by reference, is created to facilitate routing with the network setup 200. The overlay domain may include a plurality of overlay edge routers (OERs) each coupled to an overlay controller (OC). The overlay controller (OC) orchestrates secure overlay routing based on defined policy and control logic. Communications between the overlay controller (OC) and the overlay edge routers (OERs) are facilitated by an overlay protocol (OP) which runs over secure DTLS connections through a core transport network. Each overlay edge router (OER) defines an edge that is located at the boundary of the overlay domain. All overlay edge routers (OERs) connect directly with each other over the core transport network via IPSec tunnels.

FIG. 2A shows the network setup 200 with elements of the overlay domain. As will be seen said elements include overlay edge routers (OERs) R1, R2, and overlay controller (OC) 212. The overlay edge router (OER) R1 is positioned between the Host A and the NAT router 204, whereas the overlay edge router (OER) is positioned between the Host B and the NAT router 208. In use, the router R1 learns the private IP address (IPA) of the Host A and communicates it to the overlay controller (OC) 212 via the overlay protocol (OP). In a similar manner, the router R2 learns the private IPA of the Host B and communicates it to the overlay controller (OC) 212 via the overlay protocol (OP).

Figure 3:
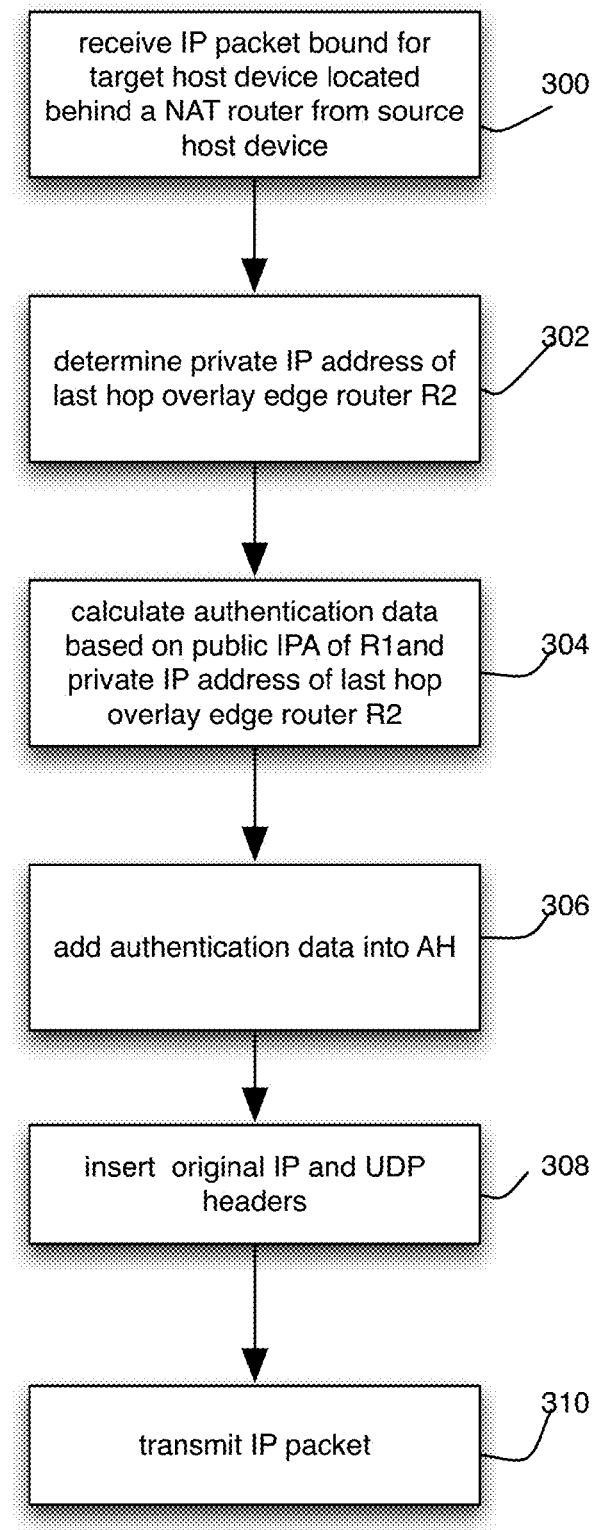
FIG. 3 shows steps by an overlay router to prepare an IP packet from transmission, in accordance with one embodiment of the invention.

FIG. 3 is a workflow drawing showing the steps involved in the transmission of IP packets from the Host A to the Host B, in accordance with one embodiment based on the overlay domain shown in FIG. 2A. The steps is the workflow are performed by the router R1 Referring to FIG. 3, the steps include the following processing blocks:

300: R1 receives an IP packet bound for a target host device (Host B) from a source host device (Host A).

302: R1 determines the private IPA of the last hop overlay edge router (R1). This is done via the overlay protocol (OP) wherein the overlay controller (OC) communicates the same to R1 via a DTLS control channel established through the network 210.

Figure 5:
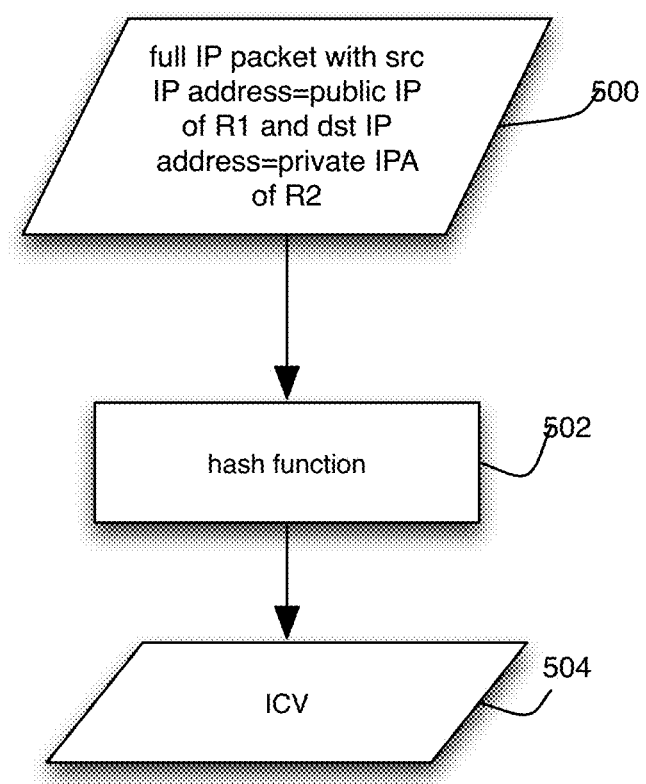
FIG. 5 shows the steps in created an integrity check value (ICV) in accordance with one embodiment of the invention.

304: R1 calculates the authentication data based on the public IP address of R1 and the private IP address R2. This is illustrated in FIG. 5 which shows the steps in produced the authentication data. Referring to FIG. 5 at block 500 the full IP packet with src IP address=public IPA of R1 and dst IP address=private IP address of R2 is received. At block 502 a hash function is used to transform the full IP packet in a hash digest or integrity check value (ICV) which is output at 504.

306: R1 adds the authentication data into the AH header portion of the IP Packet

Figure 4:
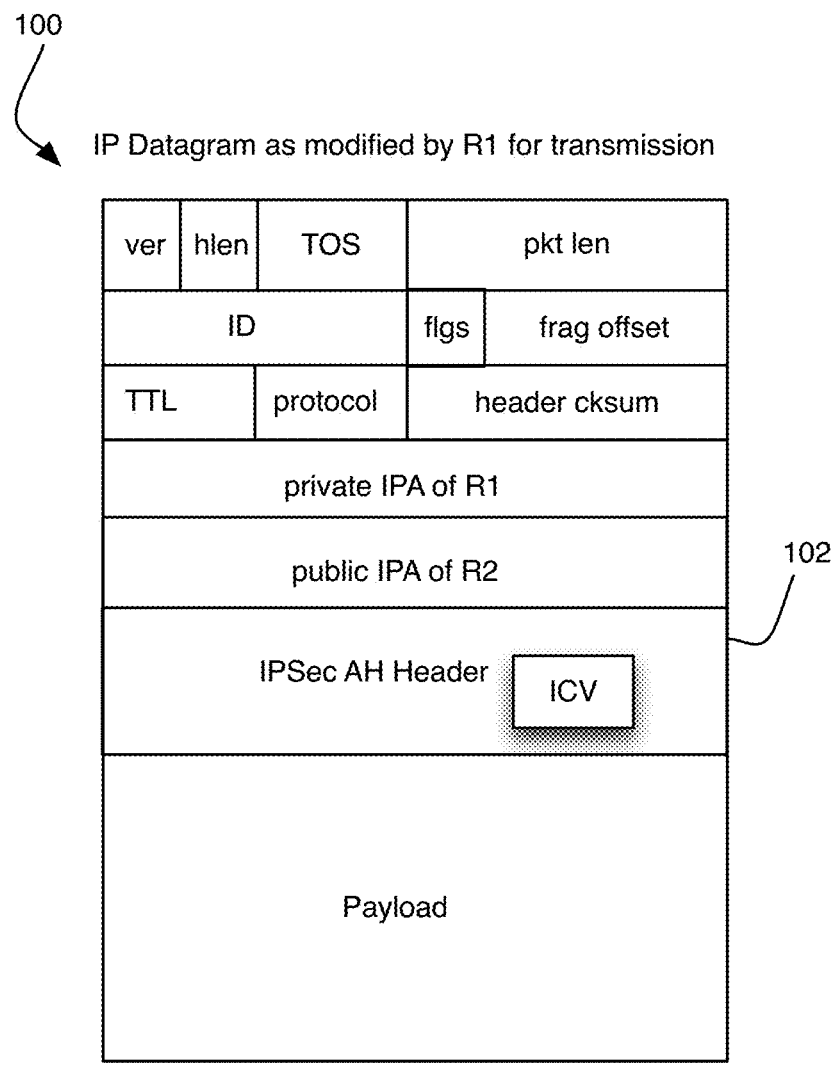
FIG. 4 shows the fields of an IP packet as modified by the process of FIG. 3.

308: R1 inserts the original IP and UDP headers into the IP packet. This means that the private IPA of R1 is the source IP address and the public IPA of R2 is the destination IP address as is shown in FIG. 4 which shows the IP packet 100 as modified by R1

310: R1 transmits the IP packet.

Figure 6:
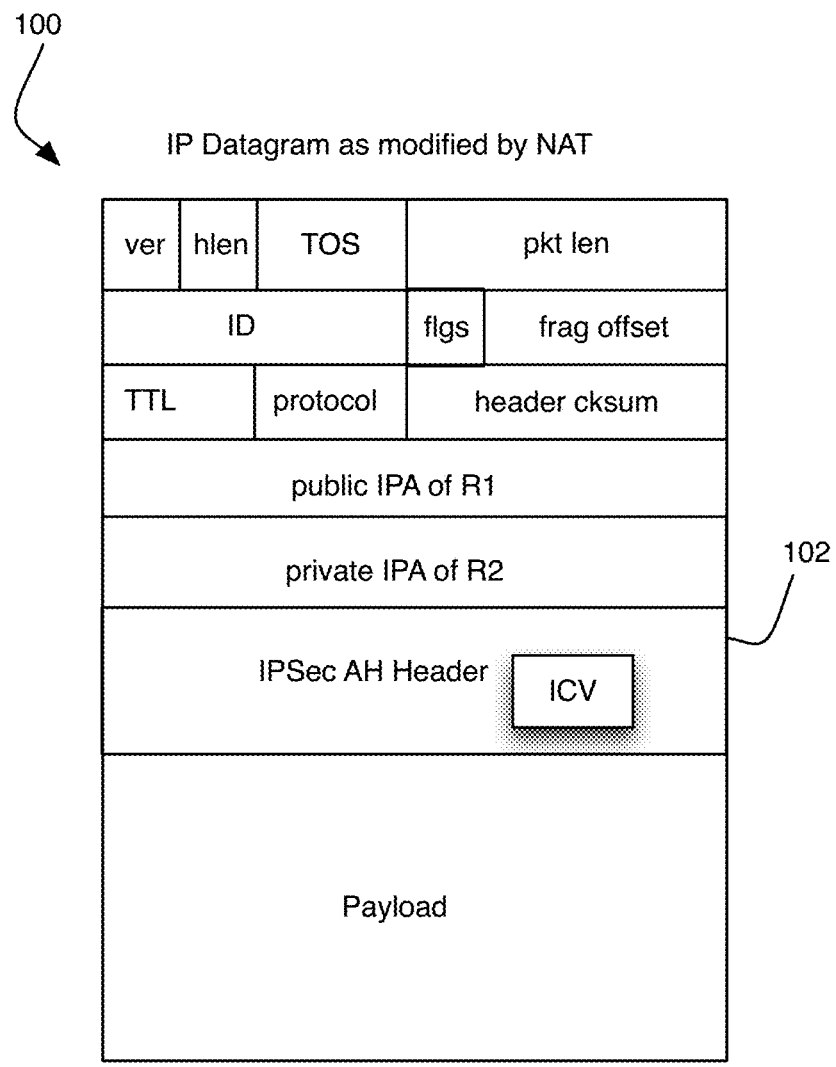
FIG. 6 shows the IP datagram of FIG. 3 as modified by a router R2.

When the packet arrives at R2 it would have been modified through NAT so that its outer header will have the public IPA of R1 as the source and the private IPA of R2 as the destination. This can be seen from FIG. 6, which shows the IP packet as modified by NAT and received at the Host B. Thus, when the Host B computes the ICV based on the packet contents it would match the ICV computed at block 304.

Figure 7:
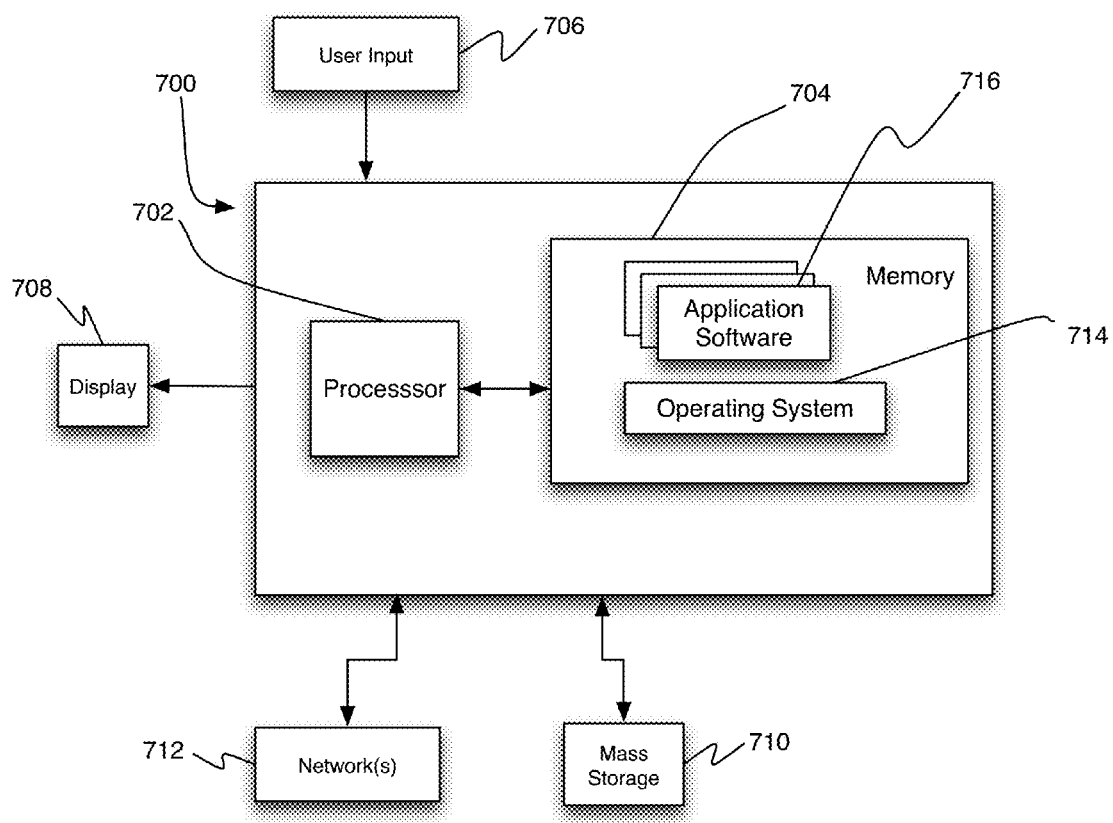
FIG. 7 shows a high-level block diagram for an overlay controller (OC), in accordance with one embodiment of the invention.

FIG. 7 shows an example of hardware 700 that may be used to implement the overlay controller (OC), in accordance with one embodiment. The hardware 700 may include at least one processor 702 coupled to a memory 704. The processor 703 may represent one or more processors (e.g., microprocessors), and the memory 704 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 704 may be considered to include memory storage physically located elsewhere in the hardware, e.g. any cache memory in the processor 702, as well as any storage capacity used as a virtual memory, e.g., as stored on a mass storage device.

The hardware also typically receives a number of inputs and outputs for communicating information externally. For interface with a user or operator, the hardware may include one or more user input output devices 706 (e.g., a keyboard, mouse, etc.) and a display 708. For additional storage, the hardware 700 may also include one or more mass storage devices 710, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 712 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 712 and each of the components, as is well known in the art.

The hardware 700 operates under the control of an operating system 714, and executes application software 716 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 8:
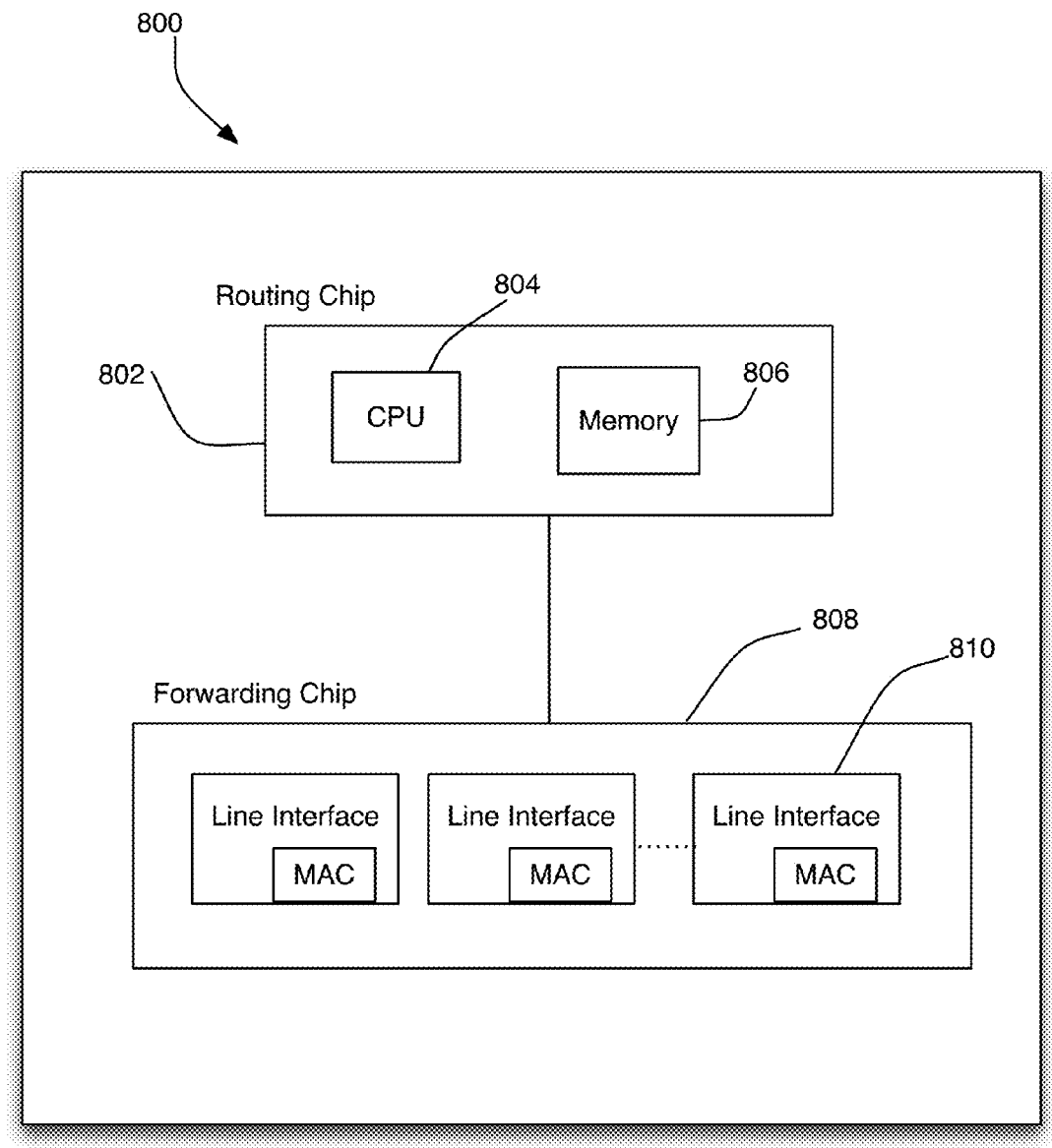
FIG. 8 shows a high-level block diagram of hardware for a router, in accordance with one embodiment of the invention.

FIG. 8 shows a block diagram of hardware 800 for routers R1 and R2, in accordance with one embodiment of the invention. Referring to FIG. 8, the hardware 800 includes a routing chip 804 coupled to a forwarding chip 808. The routing chip 804 performs functions such as path computations, routing table maintenance, and reachability propagation. Components of the routing chip include a CPU or processor 804, which is coupled to a memory 806. The memory stores instructions to perform the methods disclosed herein. The forwarding chip is responsible for packet forwarding along a plurality of line interfaces 810.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for routing, the method comprising:
    establishing an overlay network, comprising a plurality of overlay edge routers and an overlay controller (OC); wherein each overlay edge router (OER) is in communication with the overlay controller via a secure tunnel established through a core transport network; the plurality of overlay edge routers are in communication with each other via peer-to-peer links established through the core transport network; at least a first overlay edge router of the plurality of overlay edge routers is located between a first domain and a first Network Address Translation (NAT) router associated with the first domain; at least a second overlay edge router of the plurality of overlay edge routers is located between a second domain and a second NAT router associated with the second domain; and said first and second NAT routers have interfaces to a cores transport network; wherein each overlay edge router includes a private IP address and a public IP address;
    receiving Internet Protocol (IP) packets from a source host device located in the first domain bound for a target host device located in the second domain; wherein said receiving is by the first overlay edge router;
    processing each IP packet for transmission to the target host device with Internet protocol Security (IPSec IP) authentication including:
    calculating authentication data for the IP packet using the private IP address of the second overlay edge router as a destination IP address, and the public IP address of the first overlay edge router as a source IP address;
    modifying the IP packet by inserting the authentication data into the IP packet;
    inserting an outer header for the modified IP packet including the private IP address of the first overlay edge router as the source IP address, and the public IP address of the second overlay edge router as the destination IP address; and
    forwarding the modified IP packet to the first NAT router.

2. The method of claim 1, further comprising as a prior step, determining the private IP address of the second overlay edge router.

3. The method of claim 2, wherein determining the private IP address of the second overlay edge router is through a control message received from the overlay controller.

4. The method of claim 2, further comprising configuring each overlay edge router to report its private IP address to the overlay controller.

5. The method of claim 2, further comprising configuring the overlay controller to transmit to each overlay edge router the private IP address of every other overlay edge router from the plurality of overlay edge routers.

6. A method for processing an Internet Protocol (IP) packet, the method comprising:
    receiving by an overlay edge router R1 within an overlay network, the IP packet from a source host device associated with a source domain; wherein the IP packet is bound for a destination host device associated with a destination domain;
    determining by the overlay edge router R1, a private IP address of an overlay edge router R2 within the overlay network, the overlay edge router R2 being associated with the destination domain;
    processing the IP packet including:
    calculating authentication data using a public IP address of a Network Address Translation (NAT) router associated with the source domain as a source IP address, and the private IP address of the overlay edge router R2 as a destination IP address;
    modifying the IP packet to carry the authentication data;
    generating an outer header for the modified IP packet; wherein the source IP address is a private IP address of the overlay edge router R1, and the destination IP address is the private IP address of overlay edge router R2; wherein said processing is by the overlay edge router R1; and
    transmitting, by the overlay edge router R1, the modified IP packet to the NAT router.

7. The method of claim 6, wherein determining the private IP address of the overlay edge router R2 is via a message from an overlay controller for the overlay network.

* * * * *